US011879996B2

(12) United States Patent
Thurner et al.

(10) Patent No.: US 11,879,996 B2
(45) Date of Patent: Jan. 23, 2024

(54) LIDAR SENSORS AND METHODS FOR LIDAR SENSORS

(71) Applicant: Infineon Technologies AG, Neubiberg (DE)

(72) Inventors: Thomas Thurner, Graz (AT); David Brunner, Dobersberg (AT); Marcus Edward Hennecke, Graz (AT); Georg Schitter, Vienna (AT); Han Woong Yoo, Vienna (AT)

(73) Assignee: Infineon Technologies AG, Neubiberg (DE)

( * ) Notice: Subject to any disclaimer, the term of this patent is extended or adjusted under 35 U.S.C. 154(b) by 1060 days.

(21) Appl. No.: 16/679,748

(22) Filed: Nov. 11, 2019

(65) Prior Publication Data

US 2020/0150246 A1 May 14, 2020

(30) Foreign Application Priority Data

Nov. 12, 2018 (DE) ........................ 102018128164.1

(51) Int. Cl.
*G01S 7/481* (2006.01)
*G01S 17/06* (2006.01)

(52) U.S. Cl.
CPC ............ *G01S 7/4817* (2013.01); *G01S 17/06* (2013.01)

(58) Field of Classification Search
CPC ............................... G01S 7/4817; G01S 17/06
See application file for complete search history.

(56) References Cited

U.S. PATENT DOCUMENTS

| | | | |
|---|---|---|---|
| 6,259,414 B1 | 7/2001 | Lettington | |
| 8,014,002 B2 | 9/2011 | Keshavmurthy et al. | |
| 9,063,549 B1 | 6/2015 | Pennecot et al. | |
| 9,086,273 B1 | 7/2015 | Gruver et al. | |
| 9,128,190 B1 * | 9/2015 | Ulrich | G02B 26/08 |
| 9,835,853 B1 | 12/2017 | Shpunt et al. | |
| 10,175,344 B2 | 1/2019 | Jungwirth | |
| 2003/0046025 A1 | 3/2003 | Jamieson et al. | |

(Continued)

FOREIGN PATENT DOCUMENTS

| | | |
|---|---|---|
| CN | 201974159 U | 9/2011 |
| CN | 103472455 A | 12/2013 |

(Continued)

*Primary Examiner* — Shawn S An
(74) *Attorney, Agent, or Firm* — Harrity & Harrity, LLP

(57) ABSTRACT

A light detection and ranging (LIDAR) sensor includes a first reflective surface configured to oscillate about a first rotation axis to deflect a light beam into an environment; and a second reflective surface configured to oscillate about a second rotation axis to guide light received from the environment onto a photodetector of the LIDAR sensor. The first rotation axis and the second rotation axis extend parallel to one another. The LIDAR sensor also includes a control circuit configured to drive the first reflective surface to oscillate with a first maximum deflection angle about the first rotation axis, and to drive the second reflective surface to oscillate with a second maximum deflection angle about the second rotation axis, the first maximum deflection angle being greater than the second maximum deflection angle, and an area of the first reflective surface is less than an area of the second reflective surface.

19 Claims, 7 Drawing Sheets

(56) References Cited

U.S. PATENT DOCUMENTS

| | | | | |
|---|---|---|---|---|
| 2005/0238284 | A1* | 10/2005 | Takushima | G02B 6/29313 385/24 |
| 2008/0297895 | A1* | 12/2008 | Fujita | G03B 21/60 359/459 |
| 2010/0165322 | A1 | 7/2010 | Kane et al. | |
| 2012/0249996 | A1 | 10/2012 | Tanaka et al. | |
| 2012/0274937 | A1* | 11/2012 | Hays | G01S 17/95 356/450 |
| 2014/0078514 | A1 | 3/2014 | Zhu | |
| 2017/0164227 | A1* | 6/2017 | Zwirn | H04W 24/10 |
| 2017/0176579 | A1* | 6/2017 | Niclass | G01S 17/10 |
| 2018/0113200 | A1* | 4/2018 | Steinberg | G05D 1/024 |
| 2018/0172829 | A1* | 6/2018 | Holleczek | G01S 7/4912 |
| 2018/0231640 | A1* | 8/2018 | Han | G01S 17/931 |
| 2018/0284286 | A1* | 10/2018 | Eichenholz | G01S 17/89 |
| 2019/0090735 | A1* | 3/2019 | Fujii | A61B 3/12 |

FOREIGN PATENT DOCUMENTS

| | | | |
|---|---|---|---|
| CN | 107024686 | A | 8/2017 |
| CN | 107356930 | A | 11/2017 |
| CN | 108387908 | A | 8/2018 |
| CN | 108732577 | A | 11/2018 |
| DE | 102008019615 | A1 | 11/2009 |
| KR | 20180052379 | A | 5/2018 |
| WO | 2017148583 | A1 | 9/2017 |
| WO | 2018055513 | A2 | 3/2018 |

* cited by examiner

LIDAR SENSORS AND METHODS FOR LIDAR SENSORS

RELATED APPLICATION

This application claims priority to German Patent Application No. 102018128164.1, filed on Nov. 12, 2018, which is incorporated herein by reference in its entirety.

FIELD

Exemplary embodiments relate to LIght Detection And Ranging (LIDAR) sensors and to methods for LIDAR sensors.

BACKGROUND

LIght Detection And Ranging (LIDAR) scanning systems based on MicroElectroMechanical System (MEMS) mirrors use a scanning system based on MEMS mirrors in order to allow lateral scanning of the environment in one dimension (1D) or in two dimensions (2D), to reduce the required laser illumination power, to increase the scan resolution and/or in order to make 1D detector arrangements or point detectors usable for LIDAR applications. Such scanning systems based on MEMS mirrors have a reduced field of view (FOV) only because of the limited maximum angular amplitude of the mirror oscillation. The FOV may be widened by optics, but this leads to an inferior angular resolution for the lateral scanning.

A 1D scanning mirror in the emission path in combination with a 1D detector array in the reception path furthermore does not allow long-distance LIDAR in the region of 150 meters and more. In some fields of application, such as for example in the automotive sector, the use of long-distance LIDAR with ranges of 150 meters and more would be helpful.

SUMMARY

There is therefore a need to provide an improved LIDAR sensor.

The need can be met by the subject matter of the patent claims.

One exemplary embodiment relates to a LIDAR sensor. The LIDAR sensor contains a first reflective surface, which is configured to oscillate about a first rotation axis in order to deflect a light beam into an environment of the LIDAR sensor. The LIDAR sensor furthermore contains a second reflective surface, which is configured to oscillate about a second rotation axis in order to guide light received from the environment of the LIDAR sensor onto a photodetector of the LIDAR sensor. The first rotation axis and the second rotation axis extend parallel to one another. The LIDAR sensor furthermore contains a control circuit, which is adapted to drive the first reflective surface to oscillate with a first maximum deflection angle about the first rotation axis, and to drive the second reflective surface to oscillate with a second maximum deflection angle about the second rotation axis. The first maximum deflection angle is greater than the second maximum deflection angle, and an area of the first reflective surface is less than an area of the second reflective surface.

A further exemplary embodiment relates to a method for a LIDAR sensor. The method comprises deflecting a light beam into an environment of the LIDAR sensor by means of a first reflective surface, which oscillates about a first rotation axis. The method furthermore comprises guiding light received from the environment of the LIDAR sensor onto a photodetector of the LIDAR sensor by means of a second reflective surface, which oscillates about a second rotation axis. The first rotation axis and the second rotation axis extend parallel to one another, and an area of the first reflective surface is less than an area of the second reflective surface. The method also comprises driving the first reflective surface so that it oscillates with a first maximum deflection angle about the first rotation axis. The method furthermore comprises driving the second reflective surface so that it oscillates with a second maximum deflection angle about the second rotation axis. The first maximum deflection angle is greater than the second maximum deflection angle.

One exemplary embodiment also relates to a further LIDAR sensor. The LIDAR sensor comprises a first reflective surface, which is configured to oscillate about a first rotation axis in order to deflect a first light beam into an environment of the LIDAR sensor. The LIDAR sensor furthermore comprises a second reflective surface, which is configured to oscillate about a second rotation axis in order to deflect a second light beam into the environment of the LIDAR sensor.

One exemplary embodiment furthermore relates to a further method for a LIDAR sensor. The method comprises deflecting a first light beam into an environment of the LIDAR sensor by means of a first reflective surface, which oscillates about a first rotation axis. The method furthermore comprises deflecting a second light beam into an environment of the LIDAR sensor by means of a second reflective surface, which oscillates about a second rotation axis.

BRIEF DESCRIPTION OF THE DRAWINGS

Some examples of devices and/or methods will be explained in more detail merely by way of example below with reference to the appended figures, in which:

FIG. 2 shows an exemplary embodiment of mechanically coupled MEMS mirrors;

DETAILED DESCRIPTION

Various examples will now be described while making explicit reference to the appended figures, in which some examples are represented. In the figures, the thicknesses of lines, layers and/or regions may be exaggerated for illustration.

While further examples of various modifications and alternative forms are suitable, some particular examples thereof are accordingly shown in the figures and will be described explicitly below. This detailed description does not, however, restrict further examples to the particular forms described. Further examples may cover all modifications, correspondences and alternatives which fall within the scope of the disclosure. References which are the same or similar refer throughout the description of the figures to elements which are the same or similar and which may be implemented in an identical or modified form in relation to one another, while they provide the same or a similar function.

It is to be understood that when an element is referred to as "connected" or "coupled" to another element, the elements may be connected or coupled directly or via one or more intermediate elements. When two elements A and B are combined by using an "or", this is to be understood as meaning that all possible combinations are disclosed, i.e. only A, only B, as well as A and B, unless explicitly or implicitly defined otherwise. An alternative formulation for the same combinations is "at least one of A and B" or "A and/or B". The same applies mutatis mutandis for combinations of more than two elements.

The terminology which is used here to describe particular examples is not intended to be limiting for further examples. When a singular is used, e.g. "a, an, one" and "the", and the use of only a single element is neither explicitly nor implicitly defined as compulsory, further examples may also use plural elements in order to implement the same function. When a function is described below as being implemented by using a plurality of elements, further examples may implement the same function by using a single element or a single processing entity. It is furthermore to be understood that the terms "comprises", "comprising", "has" and/or "having" in use specify the presence of the indicated features, integers, steps, operations, processes, elements, components and/or a group thereof, but do not rule out the presence or the addition of one or more other features, integers, steps, operations, processes, elements, components and/or a group thereof.

Unless otherwise defined, all terms (including technical and scientific terms) are used here with their usual meaning in the field to which examples belong.

Figure 1:
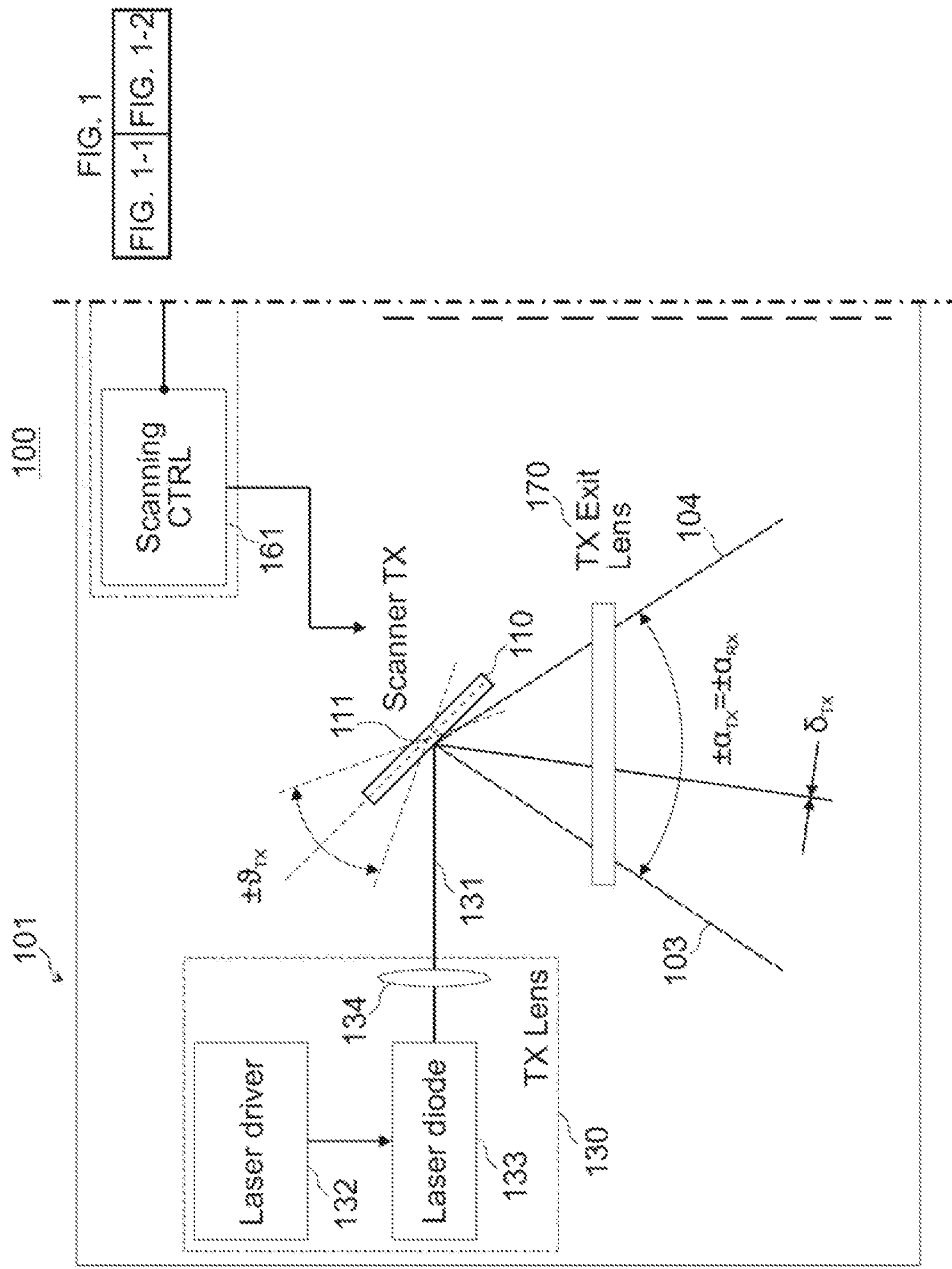
FIGS. 1-1 and 1-2 show a first exemplary embodiment of a LIDAR sensor.
Figures 1, 2:
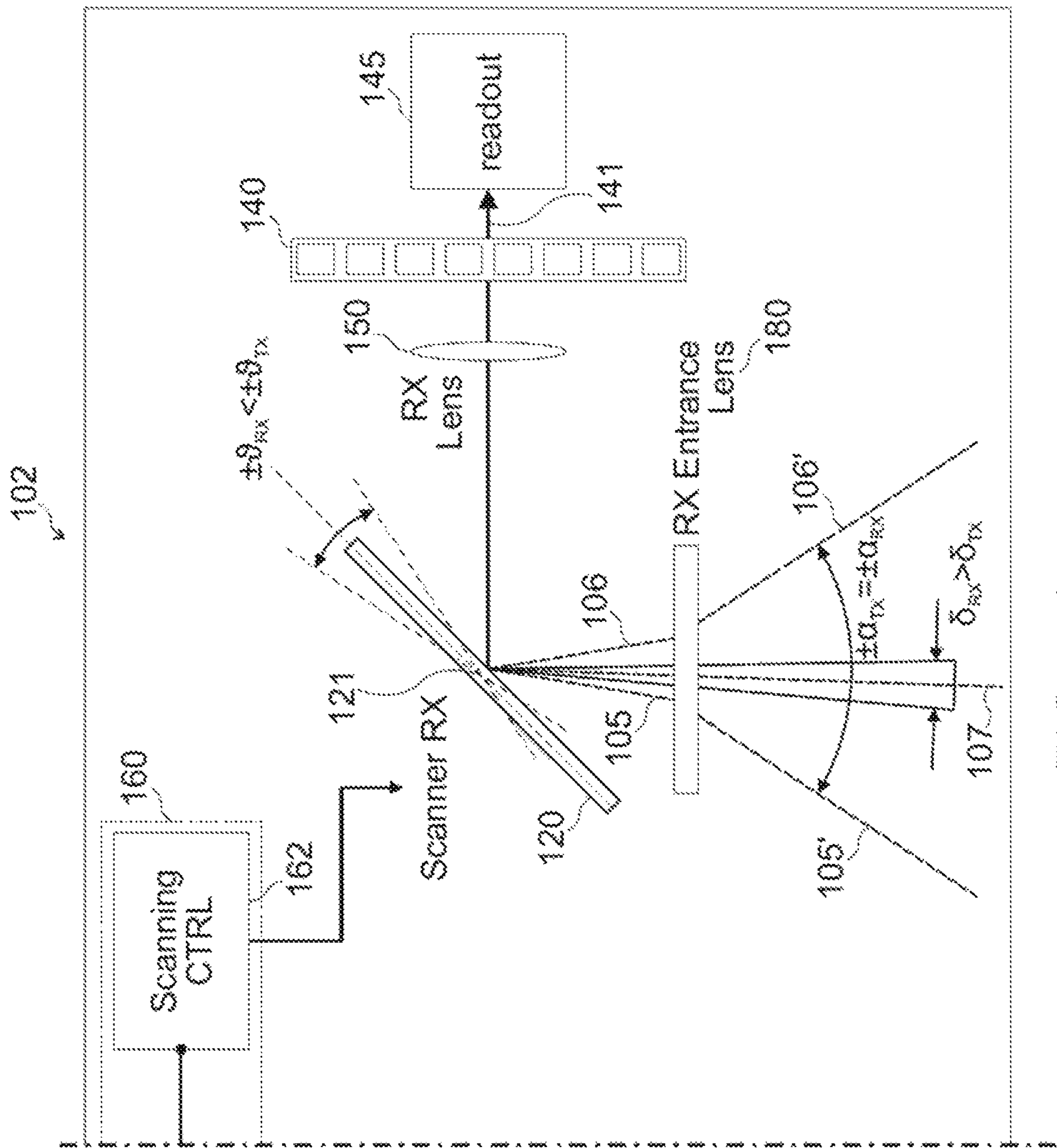
Figure 2:
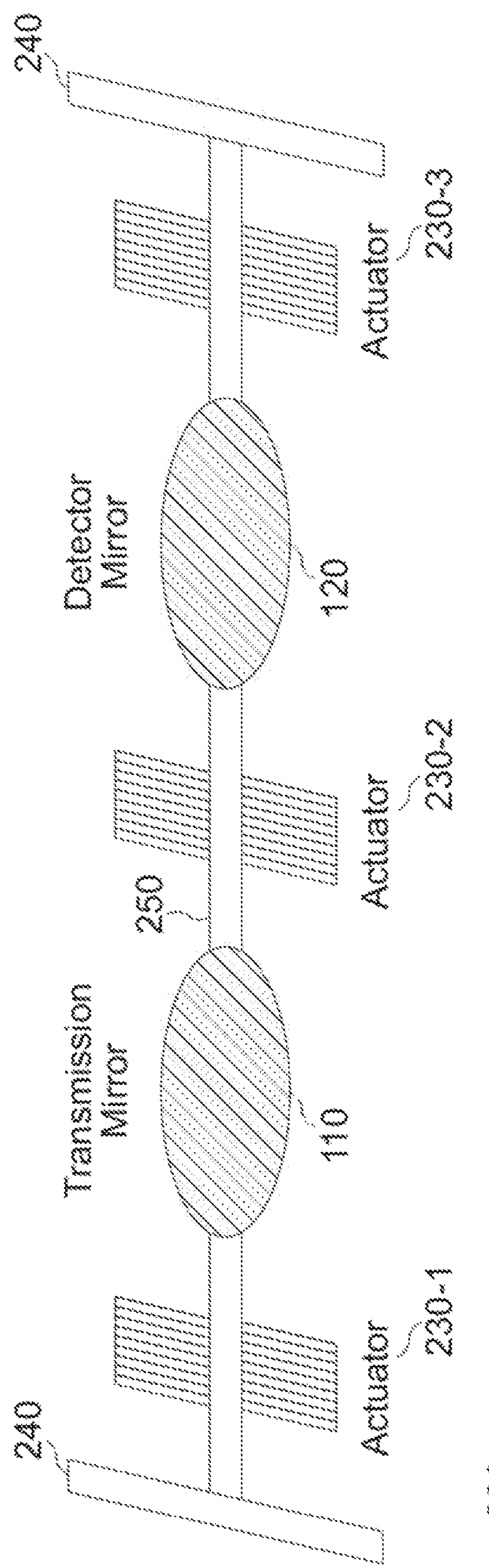

FIGS. 1-1 and 1-2 show a LIDAR sensor 100 for environment scanning. The LIDAR sensor 100 comprises an emission path 101 for emitting light into the environment of the LIDAR sensor 100, and a reception path 102 for receiving and optionally evaluating light received from the environment of the LIDAR sensor 100.

In the emission path 101, the LIDAR sensor 100 comprises a first reflective surface 110, which is configured to oscillate about a first rotation axis 111 in order to deflect a light beam 131 into the environment of the LIDAR sensor 100. This means that the first reflective surface 110 rotates about the first rotation axis along a first rotation direction from a first end position to a second end position, and vice versa. Depending on the rotational position of the first reflective surface 110 in relation to the first rotation axis 111, the light beam 131 is deflected along a different spatial direction into the environment of the LIDAR sensor 100.

The light beam 131 is generated by at least one light source 130. In the example shown in FIGS. 1-1 and 1-2, the light beam 131 is a laser light beam. For example, the light beam 131 may be a pulsed laser light beam. The pulsed laser light beam may, for example, have a pulse repetition frequency of between 10 and 200 kHz. The light source 130 comprises a laser light diode 133 which is controlled by a driver 132 in order to generate the light beam 131 in a temporally controlled fashion. The light source 130 furthermore comprises a lens arrangement 134, which comprises one or more lenses, in order to adjust optical properties of the beam (for example a beam width) and/or to guide or focus the light beam 131 onto the first reflective surface 110. The light source 130 represented in FIGS. 1-1 and 1-2 is in this case selected by way of example. According to exemplary embodiments, the light source 130 may comprise other, more (for example a beam splitter) or fewer elements (for example no lens arrangement 134) than as represented in FIGS. 1-1 and 1-2. Likewise, the light beam 131 need not be a laser light beam, but may also be any other suitable light beam. Although only one light source is respectively shown in the exemplary embodiments, a plurality of light sources 130 may respectively be provided in exemplary embodiments in order to illuminate different regions of a field of view. For example, in the exemplary embodiments a first light source in order to illuminate the field of view in a first vertical region, a second light source 130 in order to illuminate the field of view in a second vertical region and a third light source 130 in order to illuminate the field of view in a third vertical region may be provided, the first, second and third vertical regions respectively being different.

The LIDAR sensor 100 furthermore comprises in the reception path 102 a second reflective surface 120, which is configured to oscillate with respect to a second rotation axis 121 in order to guide light 103 received from the environment of the LIDAR sensor onto a photodetector 140 of the LIDAR sensor.

The first reflective surface 110 and the second reflective surface 120 may have essentially the same outer contour or shape, or different outer contours or shapes (but different dimensions). For example, the two reflective surfaces 110 and 120 may have a circular outer contour, an oval outer contour or an angled outer contour. The area of the first reflective surface 110 may in some exemplary embodiments, for example, be approximately as large as or slightly larger than a cross-sectional area of the light beam 131 (i.e. the area of the light beam 131 in the plane of the reflective surface).

An area of the first reflective surface 110 is, in the exemplary embodiment according to FIGS. 1-1 and 1-2, less than an area of the second reflective surface 120. The larger second reflective surface 120 in comparison with the first reflective surface 110 may make it possible to guide more light from the environment of the LIDAR sensor onto the photodetector 140. For example, with the same outer contour, a maximum perpendicular distance of the outer contour of the second reflective surface 120 from the second rotation axis 121 may be greater by a factor of from 1.5 to 10 than a maximum perpendicular distance of the outer contour of the first reflective surface 110 from the first rotation axis 111. For example, the maximum perpendicular distance of the outer contour of the second reflective surface 120 from the second rotation axis 121 may be three, four or five times greater than the maximum perpendicular distance of the outer contour of the first reflective surface 110 from the first rotation axis 111. Because of the greater size, the second reflective surface 120 has, for the same thickness, a greater moment of inertia than the first reflective surface 110. A decrease in the thickness in order to reduce the greater moment of inertia is typically not possible in practical applications because of the requirement for stiffness of the reflective surface.

Optionally, a lens arrangement 150 may be arranged along the beam route of the received light between the second reflective surface 120 and the photodetector 140, in order to image the light received from the environment of the LIDAR sensor 100 onto the photodetector 140.

The photodetector 140 is a light-sensitive element, which provides an output signal 141 as a function of incident light. For example, the photodetector 140 may be a single light-sensitive sensor element (i.e. a single-point sensor) or a one-dimensional or two-dimensional arrangement of light-sensitive sensor elements. In the case of a one-dimensional arrangement, the light-sensitive sensor elements are arranged only along one spatial direction, while in the case of a two-dimensional arrangement the light-sensitive sensor elements are arranged along two different (for example orthogonal) spatial directions. A light-sensitive sensor element may, for example, be a photodiode, an avalanche photodiode (APD), a single-photon avalanche diode (SPAD) or an array of SPADs as silicon photoelectron multipliers (silicon photomultipliers, SiPM). Besides information relating to a time of arrival, a pulse shape and/or an intensity of the incident light, the output signal 141 may also comprise information relating to an arrival position of the light on the photodetector 140. The output signal 141 may be read out by means of a readout circuit 145 and be provided to an evaluation circuit (not shown). For example, the evaluation circuit may determine the time of flight of a pulse of the light beam 131 from the output signal 141 by using known evaluation methods, and thus determine a distance of an object at which the light beam 131 has been reflected back to the LIDAR sensor 100. In a similar way, the evaluation circuit may also determine further parameters, for example the surface properties (for example reflectivity) or inclination of the reflecting object.

The first rotation axis 111 and the second rotation axis 121 extend parallel to one another. Rotation axes extending parallel may, for example, be oriented in such a way that the first rotation axis 111 and the second rotation axis 121 lie on a single line (coaxially), i.e. the first rotation axis 111 and the second rotation axis 121 may be oriented without an offset along a common spatial direction. Likewise, the first rotation axis 111 and the second rotation axis 121 may be oriented parallel but lie offset with respect to one another, i.e. the first rotation axis 111 and the second rotation axis 121 may be oriented offset with respect to one another along parallel spatial directions. In some exemplary embodiments, both the first reflective surface 110 and the second reflective surface 120 are configured as micromechanical mirrors which are respectively rotatable only about one axis, i.e. they have only one rotational degree of freedom. Such mirrors are also referred to as one-dimensional mirrors (1D mirrors). In these exemplary embodiments, the first rotation axis 111 and the second rotation axis 121 are therefore rigid relative to the further components of the emission path 101 or reception path 102, respectively.

The LIDAR sensor 100 furthermore comprises a control circuit 160, which is adapted to drive the first reflective surface 110 to oscillate about the first rotation axis 111 with a first maximum deflection angle $\vartheta_{TX}$, and in order to drive the second reflective surface 120 to oscillate about the second rotation axis 121 with a second maximum deflection angle $\vartheta_{RX}$. This means that the first end position and the second end position (turning points of the oscillation) of the reflective surface 110 correspond to an deflection of the reflective surface 110 through the first maximum deflection angle $\vartheta_{TX}$ from a resting position, or central position, of the reflective surface 110. During an oscillation from the first end position to the second end position, the reflective surface 110 therefore changes its orientation by the angle 2 $\vartheta_{TX}$. Correspondingly, end positions of the oscillation movement of the second reflective surface 120 are determined by the second maximum deflection angle $\vartheta_{RX}$.

The first maximum deflection angle $\vartheta_{TX}$ is greater than the second maximum deflection angle $\vartheta_{RX}$. For example, the first maximum deflection angle $\vartheta_{TX}$ may be at least two times or three times as great as the second maximum deflection angle $\vartheta_{RX}$. In some exemplary embodiments, the first maximum deflection angle $\vartheta_{TX}$ may, for example, be greater than the second maximum deflection angle $\vartheta_{RX}$ by a factor of from three to ten. For example, the first maximum deflection angle may be $\vartheta_{TX}=\pm 15°$ and the second maximum deflection angle may be $\vartheta_{RX}=\pm 3°$. In other words: the first reflective surface 110 has a greater deflection than the second reflective surface 120. Compared with an oscillation in which the first maximum deflection angle is equal to or even less than the second maximum deflection angle, the described embodiment makes it possible to achieve a significantly increased field of view.

The second reflective surface 120 makes it possible to guide light selectively onto the photodetector 140, in order to suppress light from regions of the environment of the LIDAR sensor 100 which have not just been scanned, or irradiated, by the deflected light beam 131. Correspondingly, the proportion of background light which strikes the photodetector 140 may be reduced. In other words: the second reflective surface 120 may make it possible to increase the proportion of reflected light of the deflected light beam 131 which strikes the photodetector 140 in comparison with the incident background light. The larger area of the second reflective surface 120 furthermore makes it possible to guide a greater amount of light onto the photodetector 140. The smaller angular amplitude of the second reflective surface 120 (for example a factor of five compared with the first reflective surface 110) allows direction-sensitive reception in a small angle range. The use of oscillating reflective surfaces in both the emission path 101 and the reception path 102 may therefore allow a (significant) increase in a signal-to-noise-ratio (SNR) in the photodetector 140. Because of the improved SNR, the LIDAR sensor 100 may also allow LIDAR measurements in the range of 100 meters and more. The LIDAR sensor 100 may, for example, allow long-distance LIDAR with ranges of 150 meters and more.

The LIDAR sensor 100 may for example be used in a vehicle (not shown) in order to detect an environment of the vehicle at a distance of 150 meters and more even in daylight, or sunshine.

A first field-of-view region of the LIDAR sensor 100, into which the light beam 131 may be deflected, is dependent on the first maximum deflection angle $\vartheta_{TX}$. In FIGS. 1-1 and 1-2, the first field-of-view region is indicated by the maximum possible (because of the oscillation of the first reflective surface 110) beam routes 103 and 104, respectively, for the deflected light beam 131. By means of the oscillation of the first reflective surface 110, the light beam 131 may therefore be deflected in an angular range of from $-\alpha_{TX}$ to $+\alpha_{TX}$. In other words: the aperture angle of the first field-of-view region is $2 \cdot \alpha_{TX}$. In the exemplary embodiment shown in FIGS. 1-1 and 1-2, $\alpha_{TX}$ corresponds to two times the maximum deflection angle $\vartheta_{TX}$. Optionally, the emission path 101 may also comprise a lens system 170 which is adapted to transmit the light beam 131 deflected by the first reflective surface 110 into the environment of the LIDAR sensor 100. The lens system 170 may comprise one or more lenses and, for example, be used in order to increase the first field-of-view region. Because of the widening of the first field-of-view region, the deflected light beam 131 is also widened, i.e. a divergence $\delta_{TX}$ of the light beam 131 is increased. Correspondingly, a resolution of the LIDAR scanning is degraded if the first field-of-view region is widened by means of the lens system 170.

A second field-of-view region, from which light that strikes the mirror 120 during the oscillation may be guided onto the photodetector 140 is determined by the second maximum deflection angle $\vartheta_{RX}$. In FIGS. 1-1 and 1-2, the second field-of-view region is indicated by the maximum possible (because of the oscillation of the second reflective surface 120) beam routes 105 and 106, respectively, for the light incident from the environment of the LIDAR sensor 100. Because of the smaller second maximum deflection angle $\vartheta_{RX}$, the second field-of-view region is smaller than the first field-of-view region, i.e. an aperture angle of the second field-of-view region is less than that of the first field-of-view region.

In order to widen the second field-of-view region to a reception field-of-view region which corresponds to the first field-of-view region, the LIDAR sensor 100 may comprise an optical reception system 180. For example, the optical reception system 180 may likewise be a lens system, although one which is different to the lens system 170 (for example in terms of focal length). In FIGS. 1-1 and 1-2, the reception field-of-view region is indicated by the maximum possible beam routes 105' and 106', respectively, for the light incident from the environment of the LIDAR sensor 100. By means of the optical reception system 180 in combination with the oscillation of the second reflective surface 120, light from an angular range of from $-\alpha_{RX}$ to $+\alpha_{RX}$ may therefore be guided onto the photodetector. The aperture angle of the reception field-of-view region is therefore $2\cdot\alpha_{RX}$, where $\alpha_{RX}=\alpha_{TX}$. In other words: the optical reception system 180 (and optionally the lens system 170) may make it possible to adjust the same or approximately the same field-of-view region for the emission path 101 as well as the reception path 102 of the LIDAR sensor 100.

The optical reception system 180 leads to an increased divergence $\delta_{RX}$ for light which is received by the optical reception system 180. For example, because of the divergence $\delta_{RX}$ increased by the optical reception system 180, the resolution in the reception path may be 1°, while the resolution of the light beam emitted into the environment is 0.1°. This is indicated in FIGS. 1-1 and 1-2 by way of example for a reception light beam 107. Instead of the narrow reception light beam 107, because of the divergence $\delta_{RX}$ increased by the optical reception system 180 in the reception path, light from a larger spatial angle, or angular range, is guided onto a light-sensitive region, activated at the scanning instant, of the photodetector 140. The increased divergence $\delta_{RX}$ in the reception path is, however, acceptable since the reception path can tolerate it. In other words: the optical reception system 180 is configured to image light from a second spatial angle onto the second reflective surface 120, the second spatial angle being (equal to or) greater than a first spatial angle, into which the first reflective surface 110 deflects the light beam 131. By means of relatively simple reception optics, a high sensitivity may therefore be made possible.

The LIDAR sensor 100 may therefore allow a simple and economical optical design with a large aperture. During operation in daylight, the SNR of the photodetector 140 may thereby be (significantly) improved.

The first reflective surface 110 may, for example, have a diameter of 2.5 mm and the second reflective surface 120 may have a diameter of 5 mm or more (for example 8 mm). With a scanning resolution of 0.1°, the second field-of-view region may then, for example, have an aperture angle of 2°. In this way, a high SNR may be achieved for, for example, a one-dimensional arrangement of light-sensitive sensor elements of the photodetector 140, so that LIDAR measurements of between 150 and 250 meters may be made possible, as is required for example for long-distance LIDAR applications for vehicles.

The control circuit 160 is adapted to drive the first reflective surface 110 and the second reflective surface 120 in such a way that they oscillate synchronously about the first rotation axis 111 and the second rotation axis 121, respectively. For example, the control circuit 160 may be adapted to drive the first reflective surface 110 and the second reflective surface 120 in such a way that they oscillate with the same frequency and a predetermined phase relation with respect to one another about the first rotation axis 111 and the second rotation axis 121, respectively. In other words: the oscillation frequency $f_{TX}$ of the first reflective surface 110 may be (substantially) identical to the oscillation frequency $f_{RX}$ of the second reflective surface 120. The control circuit 160 may be adapted to drive the first reflective surface 110 and the second reflective surface 120 so that they oscillate in-phase or with a predetermined phase shift about the first rotation axis 111 and the second rotation axis 121, respectively. The smaller maximum deflection angle for the second reflective surface 120 may make it possible to reduce a mechanical stress acting on the second reflective surface 120, so that the second reflective surface 120 can oscillate with the same frequency as the smaller first reflective surface 110. In other words: by means of the smaller maximum deflection angle, the higher moment of inertia of the second reflective surface 120 may be (at least partially) compensated for and high accelerations at the outer edge of the reflective surface 120 (which lead to deformations of the reflective surface 120 and therefore to imaging errors) may be avoided, in order to allow oscillation of the second reflective surface 120 with the same frequency as the first reflective surface 110.

The first reflective surface 110 and the second reflective surface 120 may, for example, be MEMS mirrors.

The first reflective surface 110 and the second reflective surface 120 may be either mechanically coupled or mechanically decoupled. For example, the first reflective surface 110 and the second reflective surface 120 may be formed, mechanically coupled, on a (common) semiconductor chip. This is shown by way of example for a semiconductor chip 200 in FIG. 2. The two reflective surfaces 110 and 120 are held by means of a strut structure 250 on a frame 240. By means of actuators 250-1, 250-2, 250-3, which are correspondingly driven by the control circuit 160, the reflective surfaces 110 and 120 are excited in oscillations, for example by means of electrostatic or magnetic effects. The excitation may be carried out resonantly or, alternatively, quasi-statically. Quasi-static excitation is intended to mean a system that can operate nonresonantly (i.e. it can statically hold a predetermined angle) but is operated not statically but in an oscillating controlled fashion. In the semiconductor chip 200 shown in FIG. 2, the reflective surfaces 110 and 120 are represented by way of example as MEMS mirrors.

If the reflective surfaces 110 and 120 are not mechanically coupled, and are formed for example on two different semiconductor chips, the control circuit 160 may, as indicated in FIGS. 1-1 and 1-2, comprise for example two subcircuits 161 and 162 in order respectively to drive the reflective surfaces 110 and 120 separately.

The LIDAR sensor 100 shown in FIGS. 1-1 and 1-2 may, in some exemplary embodiments, furthermore comprise one or more further reflective surfaces in both the emission path 101 and the reception path 102.

For example, the LIDAR sensor 100 may furthermore comprise a third reflective surface (not represented), which is configured to oscillate synchronously with the first reflective surface about a third rotation axis in order to deflect a further light beam into the environment of the LIDAR sensor 100. The third rotation axis is parallel to (for example coaxial with) the first rotation axis 111. The third reflective surface may, in some exemplary embodiments, be configured identically to the first reflective surface 110. Correspondingly, the control circuit 160 may be configured to drive the third reflective surface to oscillate about the third rotation axis with the first maximum deflection angle. As an alternative, the third reflective surface may also have different dimensions than the first reflective surface 110 and correspondingly be driven by the control circuit 160 to oscillate about the third rotation axis with a different deflection angle than the first maximum deflection angle. The control circuit 160 may, for example, drive the third reflective surface to oscillate in-phase or with a predetermined phase shift relative to the first reflective surface 110.

As an alternative or in addition, the LIDAR sensor 100 furthermore can comprise a fourth reflective surface, which is configured to oscillate synchronously with the second reflective surface 120 about a fourth rotation axis in order to guide light received from the environment of the LIDAR sensor 100 onto the photodetector 140. The fourth rotation axis is parallel to (for example coaxial with) the second rotation axis 121. The fourth reflective surface may, in some exemplary embodiments, be configured identically to the second reflective surface 120. Correspondingly, the control circuit 160 may be configured to drive the fourth reflective surface to oscillate about the fourth rotation axis with the second maximum deflection angle. As an alternative, the fourth reflective surface may also have different dimensions than the second reflective surface 120 and correspondingly be driven by the control circuit 160 to oscillate about the fourth rotation axis with a different deflection angle than the second maximum deflection angle. The control circuit 160 may, for example, drive the fourth reflective surface to oscillate in-phase or with a predetermined phase shift relative to the second reflective surface 120.

The LIDAR sensor 100 uses oscillating surfaces both in the emission and in the reception path. In this way, a scan speed may be increased in comparison with conventional LIDAR systems, i.e. the frame rate may be improved and faster objects may be recorded. Greater averaging of the recorded LIDAR data for each position may also be made possible, so that the SNR may be further increased.

Figure 3:
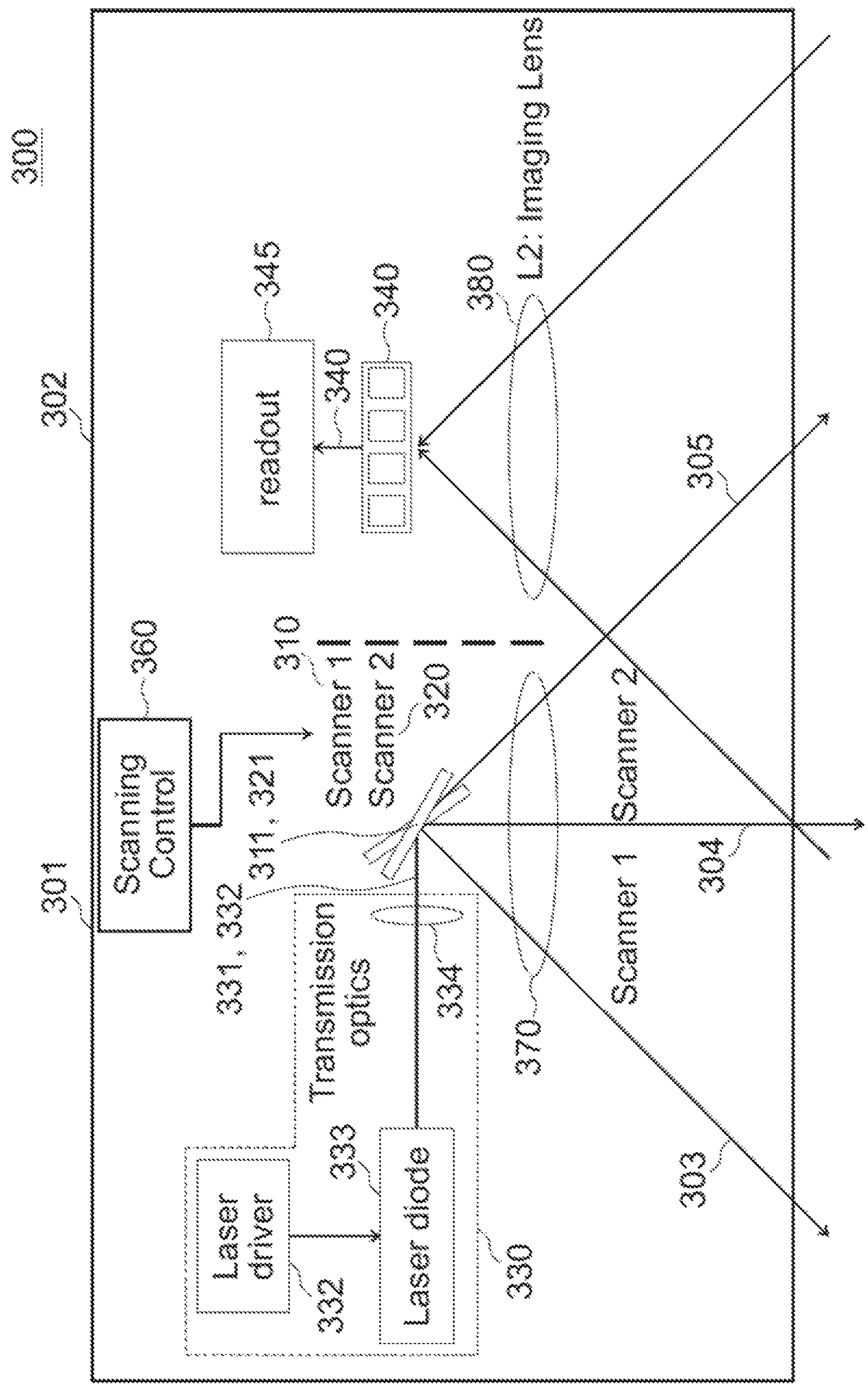
FIG. 3 shows a second exemplary embodiment of a LIDAR sensor.

FIG. 3 shows a further exemplary embodiment of a LIDAR sensor 300. The LIDAR sensor 300 again comprises an emission path 301 for emitting light into the environment of the LIDAR sensor 300, and a reception path 302 for receiving and evaluating light received from the environment of the LIDAR sensor 300.

The emission path 301 comprises a first reflective surface 310, which is configured to oscillate about a first rotation axis 311 in order to deflect a first light beam 331 into an environment of the LIDAR sensor 300. The emission path 301 also comprises a second reflective surface 320, which is configured to oscillate about a second rotation axis 321 in order to deflect a second light beam 332 into the environment of the LIDAR sensor 300. The two reflective surfaces 310 and 320 deflect the light beams 331 and 332 inside the LIDAR sensor 300 respectively onto an element which transmits the light beams 331 and 332 into the environment of the LIDAR sensor 300. For example, the two reflective surfaces 310 and 320 may deflect the light beams 331 and 332 onto emission optics 370 (for example comprising one or more lenses) through which the light beams 331 and 332 transmitted into the environment of the LIDAR sensor 300. The reflective surfaces 310 and 320 therefore respectively make it possible to deflect the light beam 331 or 332 into the environment of the LIDAR sensor 300 by means of single reflection.

The first reflective surface 310 and the second reflective surface 320 may, for example, be MEMS mirrors.

The first rotation axis 311 and the second rotation axis 321 extend parallel to one another. For example, the first rotation axis 311 and the second rotation axis 321 may lie on a single line, i.e. the first rotation axis 311 and the second rotation axis 321 may be oriented coaxially without an offset along a common spatial direction. As an alternative, the first rotation axis 311 and the second rotation axis 321 may lie offset with respect to one another, i.e. the first rotation axis 311 and the second rotation axis 321 may be oriented offset with respect to one another along parallel spatial directions.

The light beams 331 and 332 are radiated, or directed, from a light source 330 onto the first reflective surface 310 and the second reflective surface 320, respectively. In the example shown in FIGS. 1-1 and 1-2, the light beams 331 and 332 are laser light beams. The light source 330 is constructed substantially like the light source 130 described above. The light source 330 comprises at least one laser light diode 333 controlled by a driver 332, and optics 334. In some exemplary embodiments, the light source comprises a multiplicity of controlled laser light diodes. The plurality of laser light diodes may be arranged along a direction which is parallel to the rotation axes 311 and 321. It is therefore possible to generate a light beam whose light spot region is longitudinally widened in a direction parallel to the rotation axes 311 and 321. In some exemplary embodiments, the one or more laser light diodes 333 may generate both light beams 331 and 332, and the optics 334 may subsequently guide the light beams onto the first reflective surface 310 or the second reflective surface 320, respectively. In alternative exemplary embodiments, the laser light diode 333 generates a single light beam, which is split by a beam splitter of the optics 334 (for example a prism) into the light beams 331 and 332. The light source 330 represented in FIG. 3 is in this case selected by way of example. According to exemplary embodiments, the light source 330 may comprise other, more or fewer elements than as represented in FIG. 3. Likewise, the light beam 331 need not be a laser light beam, but may also be any other suitable light beam.

The reception path 302 comprises a photodetector 340, which is configured to receive light received from the environment of the LIDAR sensor 300. The photodetector 340 is substantially identical to the photodetector 140 described above. An output signal 341 of the photodetector 340 may be read out by means of a readout circuit 345 and evaluated by an evaluation circuit (not shown) according to the principles described above.

The LIDAR sensor 300 furthermore comprises a control circuit 360, which is adapted to drive the first reflective surface 310 and the second reflective surface 320 in such a way that they oscillate synchronously about the first rotation axis 311 and the second rotation axis 321, respectively. For example, the control circuit 360 may be adapted to drive the first reflective surface 310 and the second reflective surface 320 to oscillate with the same frequency and a predetermined phase relation with respect to one another about the first rotation axis 311 and the second rotation axis 321, respectively. The oscillation frequency $f_{TX}$ of the first reflective surface 310 may thus be (substantially) identical to the oscillation frequency $f_{RX}$ of the second reflective surface 320. The control circuit 360 may be adapted to drive the first reflective surface 310 and the second reflective surface 320 to oscillate in-phase or with a predetermined phase shift about the first rotation axis 311 and the second rotation axis 321, respectively.

The first reflective surface 310 and the second reflective surface 320 are configured to deflect the first light beam 331 and the second light beam 332 into different field-of-view regions of the LIDAR sensor 300.

A first field-of-view region of the LIDAR sensor 300, into which the first light beam 331 may be deflected, is determined by the oscillation movement of the first reflective surface 310. In FIG. 3, the first field-of-view region is indicated by the maximum possible (because of the oscillation of the first reflective surface 310) beam routes 303 and 304, respectively, for the first light beam 331. A second field-of-view region of the LIDAR sensor 300, into which the second light beam 332 may be deflected, is determined by the oscillation movement of the second reflective surface 320. In FIG. 3, the second field-of-view region is indicated by the maximum possible (because of the oscillation of the second reflective surface 320) beam routes 304 and 305, respectively, for the second light beam 332.

The different field-of-view regions, into which the first light beam 331 and the second light beam 332 may be deflected, may for example be adjusted by different rotation angle ranges in which the reflective surfaces 310 and 320 can oscillate. For example, a resting position, or central position, of the second reflective surface 320 may be different to a resting position, or central position, of the first reflective surface 310 (for example rotated), so that, with otherwise identical oscillation movement, the reflective surfaces 310 and 320 deflect the light beams 331 and 332 into different field-of-view regions of the LIDAR sensor 300.

The use of a plurality of reflective surfaces in the emission path 301, which oscillate synchronously, may make it possible to widen the region which can be scanned by the LIDAR sensor 300. For example, the LIDAR sensor 300 may scan a larger lateral region compared with conventional sensors having only a single oscillating MEMS mirror.

Compared with conventional sensors having only a single oscillating MEMS mirror, because of the use of a plurality of reflective surfaces the entire field-of-view region may therefore be divided into a plurality of subregions, which are respectively scanned by means of one of the reflective surfaces. With the same frame or scan rate, a resolution of the LIDAR sensor 300 may therefore be increased in comparison with conventional sensors. As an alternative, with the same resolution, the frame or scan rate of the LIDAR sensor 300 may also be increased in comparison with conventional sensors.

The first reflective surface 310 and the second reflective surface 320 may again be either mechanically coupled or mechanically decoupled. For example, the first reflective surface 310 and the second reflective surface 320 may be formed, mechanically coupled, on a (common) semiconductor chip or formed, mechanically decoupled, on two separate semiconductor chips.

The LIDAR sensor 300 shown in FIG. 3 comprises two reflective surfaces 310 and 320 in order to deflect two light beams 331 and 332 respectively into the environment of the sensor. According to exemplary embodiments, the LIDAR sensor 300 may optionally also comprise further reflective surfaces (not shown) in order to deflect further light beams into the environment of the sensor. For example, the LIDAR sensor 300 may comprise three, four, five or more reflective surfaces in order to deflect light beams into the environment of the sensor. The LIDAR sensor 300 may therefore make it possible to divide the entire scanned field-of-view region into n subregions, where n indicates the number of reflective surfaces in the emission path 301 which are used for the scanning.

Optionally, the LIDAR sensor 300 may also comprise one or more reflective surfaces in the reception path 302, in order to guide the light received from the environment of the LIDAR sensor 300 onto the photodetector 340. For example, the LIDAR sensor 300 may comprise a third reflective surface (not shown), which is configured to oscillate synchronously with the first reflective surface 310 about a third rotation axis in order to guide the light received from the environment of the LIDAR sensor 300 onto the photodetector 340. The third rotation axis is parallel to (for example coaxial with) the first rotation axis 311. The third reflective surface may be configured identically to the first reflective surface or, as illustrated above in connection with FIGS. 1-1 and 1-2, it may be larger than the first reflective surface. The driving of the third reflective surface by the control circuit 360 may, for example, be carried out according to the principles explained above in connection with FIGS. 1-1 and 1-2. For example, the control circuit 360 may be configured to drive the third reflective surface to oscillate synchronously with one of the reflective surfaces 310 and 320.

Furthermore, the LIDAR sensor 300 may optionally also comprise reception optics 380 (for example a lens system) in order to image the light incident from the environment onto the photodetector 380, or the third reflective surface.

Figure 4:
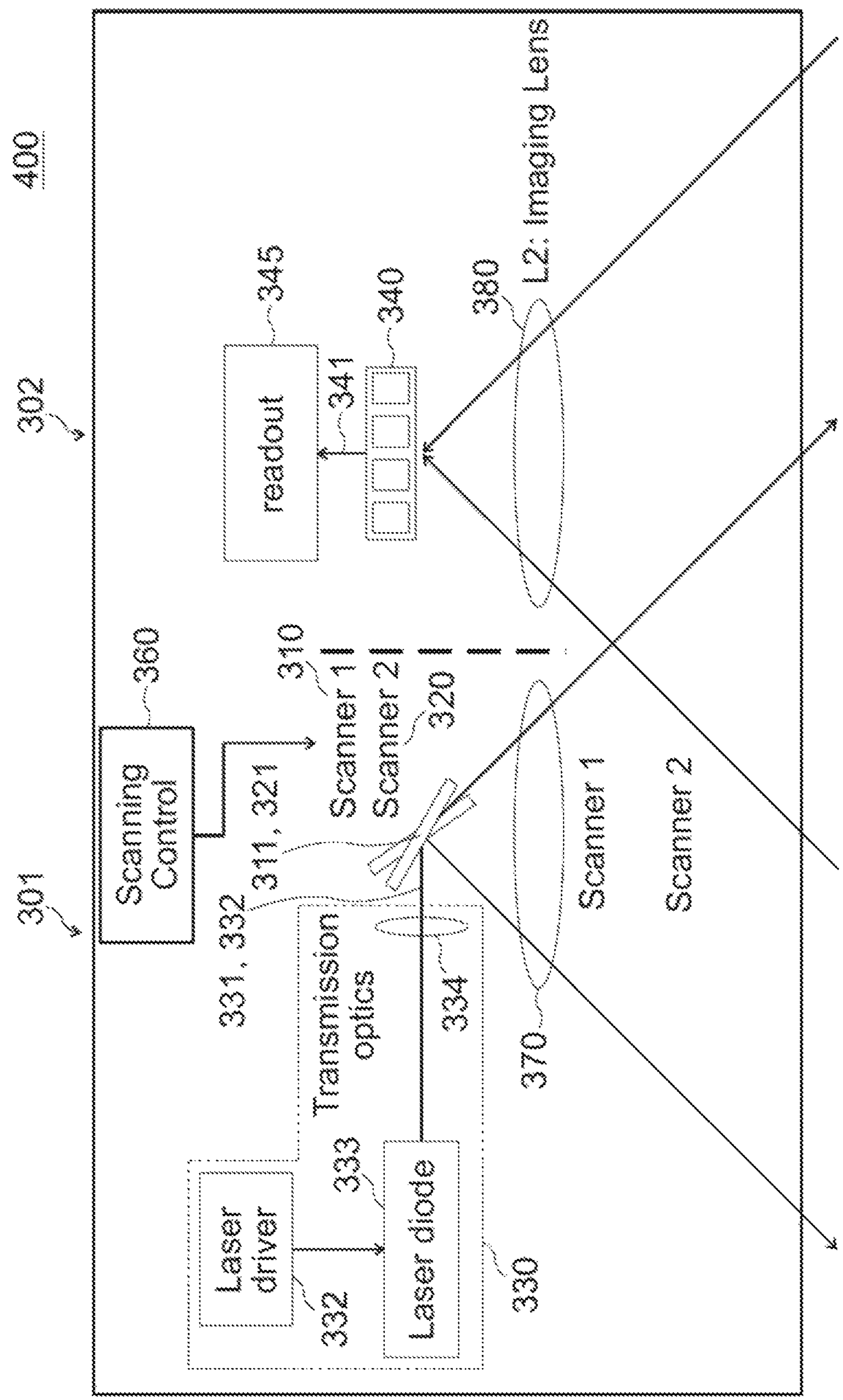
FIG. 4 shows a third exemplary embodiment of a LIDAR sensor.

FIG. 4 represents a further LIDAR sensor 400. The LIDAR sensor 400 is substantially identical to the LIDAR sensor 300, but the first reflective surface 310 and the second reflective surface 320 are configured to deflect the first light beam 331 and the second light beam 332 into the same field-of-view region of the LIDAR sensor.

For example, this may be achieved by identical rotation angle ranges in which the reflective surfaces 310 and 320 can oscillate. A resting position, or central position, of the second reflective surface 320 may for example be identical to a resting position, or central position, of the first reflective surface 310, so that, with otherwise identical oscillation movement, the reflective surfaces 310 and 320 deflect the light beams 331 and 332 into the same field-of-view region of the LIDAR sensor 400.

By the deflection of a plurality of light beams into the same field-of-view region of the LIDAR sensor 400, the number of measurement points may be increased in comparison with conventional sensors having only a single oscillating MEMS mirror. Correspondingly, a scan resolution of the LIDAR sensor 400 may be improved. Because of the scanning of the same field-of-view region by means of a plurality of reflective surfaces, the frame or scan rate of the LIDAR sensor 400 may also be increased in comparison with conventional sensors.

Figure 5:
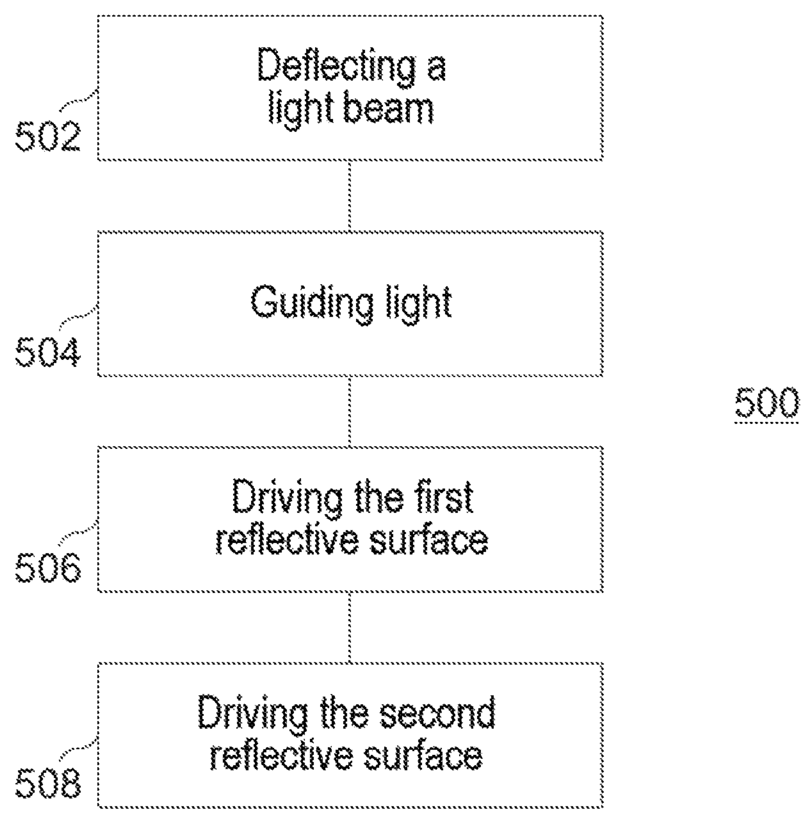
FIG. 5 shows a flowchart of an exemplary embodiment of one method for a LIDAR sensor.
Figure 6:
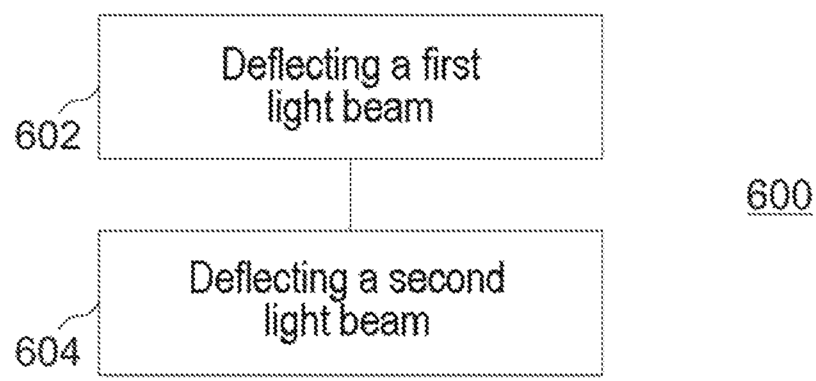
FIG. 6 shows a flowchart of an exemplary embodiment of a further method for a LIDAR sensor.

In order once more to summarize the above-described aspects relating to the operation of LIDAR sensors, FIGS. 5 and 6 also show two flowcharts of methods for LIDAR sensors.

FIG. 5 shows a flowchart of a first method 500 for a LIDAR sensor. Method 500 comprises deflecting 502 a light beam into an environment of the LIDAR sensor by means of a first reflective surface, which oscillates about a first rotation axis. Method 500 furthermore comprises guiding 504 light received from the environment of the LIDAR sensor onto a photodetector of the LIDAR sensor by means of a second reflective surface, which oscillates about a second rotation axis. The first rotation axis and the second rotation axis extend parallel to one another, and an area of the first reflective surface is less than an area of the second reflective surface. Method 500 also comprises driving 506 the first reflective surface to oscillate with a first maximum deflection angle about the first rotation axis. Method 500 furthermore comprises driving 508 the second reflective surface to oscillate with a second maximum deflection angle about the second rotation axis. The first maximum deflection angle is greater than the second maximum deflection angle.

Further details and aspects of method 500 are described above in connection with further exemplary embodiments (for example FIGS. 1 and 2). Method 500 may comprise one or more optional features according to the further exemplary embodiments.

A flowchart of a second method 600 for a LIDAR sensor is shown in FIG. 6. Method 600 comprises deflecting 602 a first light beam into an environment of the LIDAR sensor by means of a first reflective surface, which oscillates about a first rotation axis. Method 600 furthermore comprises deflecting 604 a second light beam into an environment of the LIDAR sensor by means of a second reflective surface, which oscillates about a second rotation axis.

Further details and aspects of method 600 are described above in connection with further exemplary embodiments (for example FIGS. 3 and 4). Method 600 may comprise one or more optional features according to the further exemplary embodiments.

The exemplary embodiments described herein may be summarized as follows:

Some exemplary embodiments relate to a LIDAR sensor. The LIDAR sensor comprises a first reflective surface, which is configured to oscillate about a first rotation axis in order to deflect a light beam into an environment of the LIDAR sensor. The LIDAR sensor also contains a second reflective surface, which is configured to oscillate about a second rotation axis in order to guide light received from the environment of the LIDAR sensor onto a photodetector of the LIDAR sensor. The first rotation axis and the second rotation axis extend parallel to one another. The LIDAR sensor furthermore comprises a control circuit, which is adapted to drive the first reflective surface to oscillate with a first maximum deflection angle about the first rotation axis, and to drive the second reflective surface to oscillate with a second maximum deflection angle about the second rotation axis. The first maximum deflection angle is greater than the second maximum deflection angle, and an area of the first reflective surface is less than an area of the second reflective surface.

In some exemplary embodiments, the control circuit is adapted to drive the first reflective surface and the second reflective surface to oscillate synchronously about the first rotation axis and the second rotation axis, respectively.

For example, the control circuit may be adapted to drive the first reflective surface and the second reflective surface to oscillate with the same frequency and a predetermined phase relation with respect to one another about the first rotation axis and the second rotation axis, respectively.

According to some exemplary embodiments, the LIDAR sensor furthermore comprises an optical reception system, which is configured to image light from a second spatial angle onto the second reflective surface, the second spatial angle being equal to or greater than a first spatial angle, into which the first reflective surface deflects the light beam.

For example, the optical reception system may be a first lens system, and the LIDAR sensor may furthermore comprise a second lens system which is different to the first lens system and is adapted to transmit light beams deflected by the first reflective surface into the environment of the LIDAR sensor.

In some exemplary embodiments, the first maximum deflection angle is at least three times as great as the second maximum deflection angle.

According to some exemplary embodiments, the photodetector is a one-dimensional or two-dimensional arrangement of light-sensitive sensor elements.

In some exemplary embodiments, the first reflective surface and the second reflective surface are mechanically coupled.

As an alternative, the first reflective surface and the second reflective surface may also be mechanically decoupled.

According to some exemplary embodiments, the first reflective surface is a MEMS mirror.

In some exemplary embodiments, the LIDAR sensor furthermore comprises a third reflective surface, which is configured to oscillate synchronously with the first reflective surface about a third rotation axis in order to deflect a further light beam into the environment of the LIDAR sensor.

According to some exemplary embodiments, the LIDAR sensor furthermore comprises a fourth reflective surface, which is configured to oscillate synchronously with the second reflective surface about a fourth rotation axis in order to guide light received from the environment of the LIDAR sensor onto the photodetector.

In some exemplary embodiments, the LIDAR sensor furthermore comprises a light source, which is adapted to generate the light beam and optionally the further light beam.

Exemplary embodiments also relate to a further LIDAR sensor. The LIDAR sensor comprises a first reflective surface, which is configured to oscillate about a first rotation axis in order to deflect a first light beam into an environment of the LIDAR sensor. The LIDAR sensor furthermore comprises a second reflective surface, which is configured to oscillate about a second rotation axis in order to deflect a second light beam into the environment of the LIDAR sensor.

In some exemplary embodiments, the LIDAR sensor furthermore comprises a control circuit, which is adapted to drive the first reflective surface and the second reflective surface to oscillate synchronously about the first rotation axis and the second rotation axis, respectively.

For example, the control circuit may be adapted to drive the first reflective surface and the second reflective surface to oscillate with the same frequency and a predetermined phase relation with respect to one another about the first rotation axis and the second rotation axis, respectively.

According to some exemplary embodiments, the first reflective surface and the second reflective surface are configured to deflect the first light beam and the second light beam into the same field-of-view region of the LIDAR sensor.

In some exemplary embodiments, the first reflective surface and the second reflective surface are configured to deflect the first light beam and the second light beam into different field-of-view regions of the LIDAR sensor.

According to some exemplary embodiments, the LIDAR sensor furthermore comprises a photodetector, which is configured to receive light received from the environment of the LIDAR sensor.

In some exemplary embodiments, the LIDAR sensor comprises a third reflective surface, which is configured to oscillate synchronously with the first reflective surface about a third rotation axis in order to guide the light received from the environment of the LIDAR sensor onto the photodetector.

In some exemplary embodiments, the LIDAR sensor furthermore comprises a light source, which is adapted to radiate the first light beam and the second light beam onto the first reflective surface and the second reflective surface, respectively.

Further exemplary embodiments relate to a method for a LIDAR sensor. The method comprises deflecting a light beam into an environment of the LIDAR sensor by means of a first reflective surface, which oscillates about a first rotation axis. The method furthermore comprises guiding light received from the environment of the LIDAR sensor onto a photodetector of the LIDAR sensor by means of a second reflective surface, which oscillates about a second rotation axis. The first rotation axis and the second rotation axis extend parallel to one another, and an area of the first reflective surface is less than an area of the second reflective surface. The method also comprises driving the first reflective surface to oscillate with a first maximum deflection angle about the first rotation axis. The method furthermore comprises driving the second reflective surface to oscillate with a second maximum deflection angle about the second rotation axis. The first maximum deflection angle is greater than the second maximum deflection angle.

Exemplary embodiments furthermore relate to a further method for a LIDAR sensor. The method comprises deflecting a first light beam into an environment of the LIDAR sensor by means of a first reflective surface, which oscillates about a first rotation axis. The method furthermore comprises deflecting a second light beam into an environment of the LIDAR sensor by means of a second reflective surface, which oscillates about a second rotation axis.

The use of a plurality of mirrors in the emission path, which are synchronized in respect of oscillation frequency and oscillation phase, may increase the lateral FOV. The use of a plurality of mirrors in the emission path or in the emission and reception path may improve the SNR of the scan receiver by adjusting its aperture angle (for example reducing the ambient light) and by this power increase allow long-distance LIDAR.

The aspects and features which are described in connection with one or more of the examples and figures detailed above may also be combined with one or more of the other examples in order to replace an equivalent feature of the other example or additionally to introduce the feature into the other example.

Only the principles of the disclosure are presented by the description and drawings. Furthermore, all examples mentioned here are to be expressly used in principle only for illustrative purposes, in order to assist the reader in understanding the principles of the disclosure and the concepts contributed by the inventor(s) for further development of the technology. All comments herein relating to principles, aspects and examples of the disclosure, and specific examples thereof, include their equivalents.

A block diagram may, for example, represent a rough circuit diagram which implements the principles of the disclosure. Similarly, a flowchart, a procedural diagram, a state diagram, a pseudocode and the like may represent various processes, operations or steps which, for example, are essentially represented in a computer-readable medium and thus are carried out by a computer or processor, regardless of whether such a computer or processor is explicitly shown. Methods disclosed in the description or in the patent claims may be implemented by a component which comprises a means for carrying out each of the respective steps of these methods.

It is to be understood that the disclosure of a plurality of steps, processes, operations or functions disclosed in the description or the claims is not to be set out as found in the order specified, unless otherwise explicitly or implicitly indicated, for example for technical reasons. By the disclosure of a plurality of steps or functions, they are therefore not restricted to a particular order, unless these steps or functions are not interchangeable for technical reasons. In some examples, furthermore, an individual step, function, process or operation may include a plurality of substeps, subfunctions, subprocesses or suboperations and/or be divided into these. Such substeps may be included and be part of the disclosure of this individual step, unless this is explicitly ruled out.

Furthermore, the following claims are hereby included in the detailed description, in which each claim may per se stand as a separate example. While each claim may per se stand as a separate example, it is to be noted that—even though a dependent claim may relate in the claims to a particular combination with one or more other claims—other examples may also comprise a combination of the dependent claim with the subject-matter of any other dependent or independent claim. Such combinations are explicitly proposed here, unless it is indicated that a particular combination is not intended. Furthermore, features of one claim are to also be included for any other independent claim, even if this claim is not made directly dependent on the independent claim.

What is claimed is:

1. A light detection and ranging (LIDAR) sensor, comprising:
- a first reflective surface configured to oscillate about a first rotation axis in order to deflect a light beam into an environment of the LIDAR sensor,
  - wherein the first reflective surface deflects the light beam at a first spatial angle;
- a second reflective surface configured to oscillate about a second rotation axis in order to guide light received from the environment of the LIDAR sensor onto a photodetector of the LIDAR sensor, the first rotation axis and the second rotation axis extending parallel to one another;
- a control circuit configured to drive the first reflective surface to oscillate about the first rotation axis with a first maximum deflection angle, and to drive the second reflective surface to oscillate about the second rotation axis with a second maximum deflection angle,
  - wherein the first maximum deflection angle is greater than the second maximum deflection angle,
  - wherein an outer contour of the first reflective surface corresponds to an outer contour of the second reflective surface, and
  - wherein a maximum perpendicular distance between the outer contour of the second reflective surface and the second rotation axis is greater than a maximum perpendicular distance between the outer contour of the first reflective surface and the first rotation axis; and
- an optical reception system configured to image light from a second spatial angle onto the second reflective surface, the second spatial angle being equal to or greater than the first spatial angle at which the first reflective surface deflects the light beam.

2. The LIDAR sensor as recited in claim 1, wherein the control circuit is configured to drive the first reflective surface and the second reflective surface to oscillate synchronously about the first rotation axis and the second rotation axis, respectively.

3. The LIDAR sensor as recited in claim 2, wherein the control circuit is configured to drive the first reflective surface and the second reflective surface to oscillate with a same frequency and a predetermined phase relation with respect to one another about the first rotation axis and the second rotation axis, respectively.

4. The LIDAR sensor as recited in claim 1, wherein:
- the optical reception system is a first lens system, and
- the LIDAR sensor further comprises a second lens system that is different from the first lens system and is configured to transmit light beams deflected by the first reflective surface into the environment of the LIDAR sensor.

5. The LIDAR sensor as recited in claim 1, wherein the first maximum deflection angle is at least three times greater than the second maximum deflection angle.

6. The LIDAR sensor as recited in claim 1, wherein the photodetector is a one-dimensional or two-dimensional arrangement of light-sensitive sensor elements.

7. The LIDAR sensor as recited in claim 1, wherein the first reflective surface and the second reflective surface are mechanically coupled.

8. The LIDAR sensor as recited in claim 1, wherein the first reflective surface and the second reflective surface are mechanically decoupled.

9. The LIDAR sensor as recited in claim 1, wherein the first reflective surface is a MicroElectroMechanical System (MEMS) mirror.

10. The LIDAR sensor as recited in claim 1, further comprising:
- a third reflective surface configured to oscillate synchronously with the first reflective surface about a third rotation axis in order to deflect a further light beam into the environment of the LIDAR sensor.

11. The LIDAR sensor as recited in claim 10, further comprising:
- a fourth reflective surface configured to oscillate synchronously with the second reflective surface about a fourth rotation axis in order to guide light received from the environment of the LIDAR sensor onto the photodetector.

12. A light detection and ranging (LIDAR) sensor, comprising:
- a first reflective surface configured to oscillate about a first rotation axis in order to deflect a light beam into an environment of the LIDAR sensor,
  - wherein the first reflective surface deflects the light beam at a first spatial angle;
- a second reflective surface configured to oscillate about a second rotation axis in order to guide light received from the environment of the LIDAR sensor onto a photodetector of the LIDAR sensor, the first rotation axis and the second rotation axis extending parallel to one another;
- a control circuit configured to drive the first reflective surface to oscillate about the first rotation axis with a first maximum deflection angle, and to drive the second reflective surface to oscillate about the second rotation axis with a second maximum deflection angle that is less than the first maximum deflection angle; and
- an optical reception system configured to image light from a second spatial angle onto the second reflective surface, the second spatial angle being equal to or greater than the first spatial angle into which the first reflective surface deflects the light beam.

13. The LIDAR sensor as recited in claim 12, wherein:
- the optical reception system is a first lens system, and
- the LIDAR sensor further comprises a second lens system that is different from the first lens system and is configured to transmit light beams deflected by the first reflective surface into the environment of the LIDAR sensor.

14. The LIDAR sensor as recited in claim 12, wherein the first maximum deflection angle is at least three times greater than the second maximum deflection angle.

15. The LIDAR sensor as recited in claim 12, wherein the photodetector is a one-dimensional or two-dimensional arrangement of light-sensitive sensor elements.

16. The LIDAR sensor as recited in claim 12, wherein the first reflective surface and the second reflective surface are mechanically coupled.

17. The LIDAR sensor as recited in claim 12, wherein the first reflective surface and the second reflective surface are mechanically decoupled.

18. The LIDAR sensor as recited in claim 12, wherein the first reflective surface is a MicroElectroMechanical System (MEMS) mirror.

19. The LIDAR sensor as recited in claim 12, further comprising:
- a third reflective surface configured to oscillate synchronously with the first reflective surface about a third rotation axis in order to deflect a further light beam into the environment of the LIDAR sensor.

* * * * *